(12) United States Patent
Akiba et al.

(10) Patent No.: US 8,518,545 B2
(45) Date of Patent: Aug. 27, 2013

(54) GLASS FOR CHEMICAL TEMPERING AND GLASS PLATE FOR DISPLAY DEVICE

(75) Inventors: Shusaku Akiba, Tokyo (JP); Kazutaka Ono, Tokyo (JP); Jun Endo, Tokyo (JP); Shigeki Sawamura, Tokyo (JP); Tetsuya Nakashima, Tokyo (JP); Yuichi Kuroki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/619,290

(22) Filed: Sep. 14, 2012

(65) Prior Publication Data

US 2013/0011650 A1    Jan. 10, 2013

Related U.S. Application Data

(63) Continuation of application No. PCT/JP2011/061454, filed on May 18, 2011.

(30) Foreign Application Priority Data

May 19, 2010  (JP) ................... 2010-115365
Dec. 14, 2010 (JP) ................... 2010-278106
Dec. 24, 2010 (JP) ................... 2010-288255

(51) Int. Cl.
   *B32B 17/00*   (2006.01)
   *C03C 3/083*   (2006.01)
   *C03C 3/085*   (2006.01)

(52) U.S. Cl.
   USPC ............... 428/410; 428/426; 501/68; 501/69

(58) Field of Classification Search
   USPC ................ 501/68, 69; 428/410, 426
   See application file for complete search history.

(56) References Cited

U.S. PATENT DOCUMENTS

| | | | |
|---|---|---|---|
| 6,365,534 B1 * | 4/2002 | Koyama et al. .................. 501/69 |
| 6,387,510 B1 * | 5/2002 | Nakashima et al. ........... 428/426 |
| 7,666,511 B2 | 2/2010 | Ellison et al. |
| 7,892,999 B2 * | 2/2011 | Nagai et al. ..................... 501/70 |
| 8,158,543 B2 | 4/2012 | Dejneka et al. |
| 8,168,313 B2 * | 5/2012 | Endo et al. .................. 428/846.9 |
| 8,187,987 B2 | 5/2012 | Amin et al. |
| 8,328,602 B2 * | 12/2012 | Tamura et al. .................. 451/41 |
| 2006/0063009 A1 | 3/2006 | Naitou et al. |
| 2009/0137379 A1 * | 5/2009 | Nagai et al. ..................... 501/70 |
| 2009/0142568 A1 * | 6/2009 | Dejneka et al. ............... 428/220 |
| 2009/0197088 A1 | 8/2009 | Murata |
| 2009/0215607 A1 * | 8/2009 | Dejneka et al. ................. 501/27 |
| 2009/0298669 A1 | 12/2009 | Akiba et al. |
| 2010/0009154 A1 * | 1/2010 | Allan et al. .................... 428/220 |
| 2010/0035745 A1 | 2/2010 | Murata |
| 2010/0210442 A1 * | 8/2010 | Abramov et al. ............... 501/66 |
| 2010/0255350 A1 * | 10/2010 | Endo et al. ................. 428/846.9 |
| 2011/0008649 A1 * | 1/2011 | Tamura et al. ................ 428/836 |
| 2011/0017297 A1 * | 1/2011 | Aitken et al. ................. 136/260 |
| 2011/0045961 A1 * | 2/2011 | Dejneka et al. ................. 501/66 |
| 2011/0091704 A1 * | 4/2011 | Akiba et al. .................. 428/220 |
| 2011/0265863 A1 * | 11/2011 | Nagashima et al. .......... 136/252 |

FOREIGN PATENT DOCUMENTS

| | | |
|---|---|---|
| JP | 62-187140 | 8/1987 |
| JP | 2006-083045 | 3/2006 |
| JP | 2007-011210 | 1/2007 |
| JP | 2008-115072 | 5/2008 |
| JP | 2008-195602 | 8/2008 |
| WO | WO 2010/021746 | 2/2010 |

OTHER PUBLICATIONS

International Search Report issued Jul. 19, 2011 in PCT/JP2011/061454 filed May 18, 2011.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

To provide glass to be used for chemically tempered glass which is hardly broken even when flawed.
Glass for chemical tempering, which comprises, as represented by mole percentage based on the following oxides, from 65 to 85% of $SiO_2$, from 3 to 15% of $Al_2O_3$, from 5 to 15% of $Na_2O$, from 0 and less than 2% of $K_2O$, from 0 to 15% of MgO and from 0 to 1% of $ZrO_2$, and has a total content $SiO_2+Al_2O_3$ of $SiO_2$ and $Al_2O_3$ of at most 88%.

20 Claims, 1 Drawing Sheet

Fig.1

Fig.2

GLASS FOR CHEMICAL TEMPERING AND GLASS PLATE FOR DISPLAY DEVICE

TECHNICAL FIELD

The present invention relates to a display device such as a mobile device such as a cell phone or a personal digital assistance (PDA), a touch panel or a large-sized flat screen television such as a large-sized liquid crystal television, a glass plate for a display device suitable for e.g. a cover glass for a display device, and glass for chemical tempering suitable for such a glass plate.

BACKGROUND ART

In recent years, for a display device such as a mobile device such as a cell phone or a PDA, a touch panel or a liquid crystal television, a cover glass (protective glass) has been used in many cases in order to protect the display and to improve the appearance. Further, to a cover glass for a flat screen television such as a liquid crystal television, surface treatment, for example, formation of a film having a function such as anti-reflection, impact failure prevention, electromagnetic wave shielding, near infrared ray shielding or color tone correction may be applied in some cases.

For such a display device, weight reduction and thickness reduction are required for differentiation by a flat design or for reduction of the load for transportation. Therefore, a cover glass to be used for protecting a display is also required to be thin. However, if the thickness of the cover glass is made to be thin, the strength is lowered, and there has been a problem such that the cover glass itself is broken by e.g. a shock due to falling or flying of an object in the case of an installed type or by dropping during the use in the case of a portable device, and the cover glass cannot accomplish the essential role to protect a display device.

In order to solve the above problem, it is conceivable to improve the strength of the cover glass, and as such a method, a method to form a compressive stress layer on a glass surface is commonly known.

The method to form a compressive stress layer on a glass surface, may typically be an air quenching tempering method (physical tempering method) wherein a surface of a glass plate heated to near the softening point is quenched by air cooling or the like, or a chemical tempering method wherein alkali metal ions having a small ion radius (typically Li ions or Na ions) at a glass plate surface are exchanged with alkali ions having a larger ion radius (typically K ions) by ion exchange at a temperature lower than the glass transition point.

As mentioned above, the thickness of the cover glass is required to be thin. However, if the air quenching tempering method is applied to a thin glass plate having a thickness of less than 2 mm, as required for a cover glass, the temperature difference between the surface and the inside tends not to arise, and it is thereby difficult to form a compressive stress layer, and the desired property of high strength cannot be obtained. Therefore, a cover glass tempered by the latter chemical tempering method is usually used.

As such a cover glass, one having soda lime glass chemically tempered is widely used (e.g. Patent Document 1).

Soda lime glass is inexpensive and has a feature that the surface compressive stress S of a compressive stress layer formed at the surface of the glass by the chemical tempering can be made to be at least 550 MPa, but there has been a problem that it is difficult to make the thickness t of the compressive stress layer (hereinafter sometimes referred to as the compressive stress layer depth) to be at least 30 µm. Glass in the after-mentioned Example 27 is soda lime glass.

Therefore, one having $SiO_2$—$Al_2O_3$—$Na_2O$ type glass different from soda lime glass, chemically tempered, has been proposed for such a cover glass (e.g. Patent Documents 2 and 3).

Such $SiO_2$—$Al_2O_3$—$Na_2O$ type glass (hereinafter referred to as conventional glass) has a feature that it is possible not only to make the above S to be at least 550 MPa but also to make the above t to be at least 30 µm. Glasses in the after-mentioned Examples 28 and 29 are conventional glasses.

PRIOR ART DOCUMENTS

Patent Document
    Patent Document 1: JP-A-2007-11210
    Patent Document 2: U.S. Patent Application Publication No. 2009/0298669
    Patent Document 3: U.S. Patent Application publication No. 2008/0286548

DISCLOSURE OF INVENTION

Technical Problem

It is highly possible that a mobile device is dropped from the user's hand, pocket or bag and its cover glass gets flaws (indentations), or the dropped mobile device may be stepped on or the user may sit on the mobile device put in the pocket, and accordingly a heavy load may be applied to the cover glass in many cases.

A flat screen television such as a liquid crystal television or a plasma television, particularly a large-sized flat screen television having a size of at least 20 inches, is likely to have flaws since its cover glass has a large area, and as the screen is large, the probability of breakage from the flaws as the breakage origin is high. Further, when a flat screen television is used on the wall, it may fall down, and in such a case, a significant load is applied to the cover glass.

A touch panel is likely to have flaws such as scratches at the time of its use.

As such large or small display devices are used more widely, the number of breakage events of the cover glass itself is increased as compared with a case where the number of use was small.

It is said that a chemically tempered cover glass made of conventional glass which is used at present is broken when a force of 5 kgf=49 N is applied by means of a Vickers indenter of a Vickers hardness meter.

It is an object of the present invention to provide a glass plate for a display device which is less likely to be broken even when flawed as compared with conventional product.

Solution to Problem

The present invention provides glass for chemical tempering, which comprises, as represented by mole percentage based on the following oxides, from 65 to 85% of $SiO_2$, from 3 to 15% of $Al_2O_3$, from 5 to 15% of $Na_2O$, from 0 and less than 2% of $K_2O$, from 0 to 15% of MgO and from 0 to 1% of $ZrO_2$, and has a total content $SiO_2+Al_2O_3$ of $SiO_2$ and $Al_2O_3$ of at most 88% (hereinafter this glass for chemical tempering will sometimes be referred to as glass of the present invention). In this specification, "from 65 to 85%" for examples means "at least 65% and at most 85%", and "from 0 and less than 2%" means "at least 0% and less than 2%".

The present invention further provides glass for chemical tempering, which comprises, as represented by mole percentage based on the following oxides, from 68 to 80% of $SiO_2$, from 4 to 10% of $Al_2O_3$, from 5 to 15% of $Na_2O$, from 0 to 1% of $K_2O$, from 4 to 15% of MgO and from 0 to 1% of $ZrO_2$, and has a total content $SiO_2+Al_2O_3$ of $SiO_2$ and $Al_2O_3$ of at most 85%.

The present invention further provides the above glass for chemical tempering, which contains at most 77% of $SiO_2$, at least 8% of $Na_2O$ and from 4 to 14% of MgO, has a total content $SiO_2+Al_2O_3$ of at most 85%, has a content of CaO of less than 1% if contained, and wherein R calculated by the following formula by using the contents of the respective components is at least 0.66 (hereinafter this glass for chemical tempering will sometimes be referred to as glass α of the present invention):

$$R=0.029\times SiO_2+0.021\times Al_2O_3+0.016\times MgO-0.004\times CaO+0.016\times ZrO_2+0.029\times Na_2O+0\times K_2O-2.002$$

The present invention further provides the above glass for chemical tempering, wherein D calculated by the following formula by using the contents of the respective components is at most 0.18 (hereinafter this glass for chemical tempering will sometimes be referred to as glass β of the present invention):

$$D=12.8-0.123\times SiO_2-0.160\times Al_2O_3-0.157\times MgO-0.163\times ZrO_2-0.113\times Na_2O$$

The present invention further provides glass for chemical tempering, wherein when it is formed into a glass plate having a thickness of 1 mm and chemically tempered, and when a force of 98 N is applied to its mirror-polished surface by means of a Vickers indenter, the probability that the chemically tempered glass plate is broken is at most 10%.

Further, the present invention provides glass for chemical tempering, wherein when it is formed into a glass plate having a thickness of 1 mm and chemically tempered, and when a force of 196 N is applied to its mirror-polished surface by means of a Knoop indenter, the probability that the chemically tempered glass plate is broken is at most 10% (hereinafter this glass for chemical tempering will sometimes be referred to as glass A).

The present invention further provides the above glass for chemical tempering, wherein Δ represented by the following formula is at most 0.21:

$$\Delta=(S_{400}-S_{450})/S_{400}$$

where $S_{400}$ is a surface compressive stress obtained when the glass is formed into a glass plate having a thickness of 1 mm and immersed in $KNO_3$ at 400° C. for 6 hours, and $S_{450}$ is a surface compressive stress obtained when the glass is formed into a glass plate having a thickness of 1 mm and immersed in $KNO_3$ at 450° C. for 6 hours.

The present invention further provides chemically tempered glass, which is obtained by chemically tempering the above glass for chemical tempering.

The present invention further provides the above chemically tempered glass, which has a compressive stress layer thickness of at least 10 μm and a surface compressive stress of at least 400 MPa.

The present invention further provides a glass plate for a display device, which is obtained by chemically tempering a glass plate comprising the above glass for chemical tempering.

The present invention further provides a display device, which has a cover glass comprising the above glass plate for a display device.

The present invention still further provides the above display device, wherein the display device is a mobile device, a touch panel or a flat screen television having a size of at least 20 inches.

Heretofore, the degree how chemically tempered glass is easily broken has been considered by means of the above S and t as indices, however, the present inventors have conducted researches employing the degree how cracking form when the chemically tempered glass itself has indentations, and accomplished the present invention.

Advantageous Effects of Invention

According to the present invention, it is possible to obtain glass for chemical tempering, of which the strength can be sufficiently improved by chemical tempering, and which is less likely to have cracking resulting from indentations made when the glass is used.

Further, it is possible to obtain chemically tempered glass which is less likely to be broken even when a load such as impact or a static load is applied to the glass, since the strength of the glass is hardly decreased even when indentations are made, and glass for chemical tempering suitable for such chemically tempered glass.

Further, it is possible to obtain glass for chemical tempering, which is less likely to have cracking resulting from flaws before chemical tempering treatment, latent scratches at the time of processing the glass and chipping, and which has a reduced possibility of spontaneous breakage resulting from the cracking which occurs when the obtainable chemically tempered glass is used.

Further, it is possible to obtain a display device such as a mobile device, a touch panel or a flat screen television, using such glass for chemical tempering as a glass plate for a display device, such as a cover glass.

DESCRIPTION OF EMBODIMENTS

The chemically tempered glass and the glass plate for a display device of the present invention are obtained by chemically tempering the glass for chemical tempering of the present invention, and hereinafter they will generally be referred to as tempered glass of the present invention.

The above S of the tempered glass of the present invention is usually at least 550 MPa, typically at least 650 MPa, when the tempered glass is used for e.g. a display device. Further, e.g. in a case where the thickness of the glass is lower than 2 mm, S is preferably at most 1,400 MPa. If it exceeds 1,400 MPa, the internal tensile stress may be too great. It is more preferably at most 1,300 MPa, typically at most 1,200 MPa.

The thickness t of the surface compressive stress layer of the tempered glass of the present invention preferably exceeds 10 μm, more preferably exceeds 15 μm, typically exceeds 20 μm, when the tempered glass is used for e.g. a display device. Further, e.g. in a case where the thickness of the tempered glass is lower than 2 mm, t is preferably at most 90 μm. If it exceeds 90 μm, the internal tensile stress may be too great. It is more preferably at most 80 μm, typically at most 70 μm.

The method of chemical tempering treatment to obtain the tempered glass of the present invention is not particularly limited so long as Na ions in the glass surface layer can be ion exchanged with K ions in the molten salt, and it may, for example, be a method of immersing the glass in a heated potassium nitrate ($KNO_3$) molten salt.

Chemical tempering treatment conditions to form a chemically tempered layer (compressive stress layer) having a desired surface compressive stress on the glass may vary depending upon e.g. the thickness in the case of a glass plate. However, it is typical to immerse a glass substrate in a $KNO_3$ molten salt at from 350 to 550° C. for from 2 to 20 hours. From the economical viewpoint, the immersion is carried out under conditions of from 350 to 500° C. and from 2 to 16 hours, and more preferably, the immersion time is from 2 to 10 hours.

The tempered glass of the present invention, particularly the glass plate for a display device of the present invention, is preferably not broken even when a force of 5 kgf=49 N is applied by means of a Vickers indenter of a Vickers hardness meter. It is more preferably not broken even when a force of 7 kgf is applied, particularly preferably not broken even when a force of 10 kgf is applied. Further, the breakage ratio when a force of 20 kgf=196 N is applied by means of a Vickers indenter is preferably at most 20%, more preferably at most 10%.

Further, the tempered glass of the present invention, particularly the glass plate for a display device of the present invention, is preferably not broken even when a force of 10 kgf=98 N is applied by means of a Knoop indenter of a Knoop hardness meter. It is more preferred that the breakage ratio when a force of 20 kgf is applied is at most 10%, and it is particularly preferred that the breakage ratio when a force of 30 kgf is applied is at most 10%. The breakage ratio when a force of 20 kgf is applied to one obtained by chemically tempering the glass A is at most 10%.

The glass plate for a display device of the present invention is usually obtained by chemically tempering a glass plate obtained by processing a glass plate made of the glass for chemical tempering of the present invention by e.g. cutting, hole making, polishing, etc.

The thickness of the glass plate for a display device of the present invention is usually from 0.3 to 2 mm, typically at most 1.5 mm.

The glass plate for a display device of the present invention is typically a cover glass.

A method for producing a glass plate made of the above glass for chemical tempering is not particularly limited, and for example, various raw materials are mixed in proper amounts, heated and melted at from about 1,400 to 1,700° C. and then homogenized by deforming, stirring or the like and formed into a plate by a well-known float process, downdraw method or press method, which is annealed and then cut into a desired size to obtain the glass plate.

The glass transition point Tg of the glass for chemical tempering of the present invention, i.e. the glass of the present invention, is preferably at least 400° C. If it is lower than 400° C., the surface compressive stress is likely to be relaxed during the ion exchange, and no adequate stress may be obtained.

The temperature T2 at which the viscosity of the glass of the present invention becomes $10^2$ dPa·s is preferably at most 1,750° C.

The temperature T4 at which the viscosity of the glass of the present invention becomes $10^4$ dPa·s is preferably at most 1,350° C.

The specific gravity ρ of the present invention is preferably at most 2.50.

The Young's modulus E of the glass of the present invention is preferably at least 68 GPa. If it is less than 68 GPa, the cracking resistance or the breaking strength of the glass may be inadequate.

The Poisson's ratio σ of the glass of the present invention is preferably at most 0.25. If it exceeds 0.25, the cracking resistance of the glass may be inadequate.

Now, the glass α of the present invention will be described below.

As described above, usually, the ion exchange treatment for chemical tempering is carried out by immersing glass containing sodium (Na) in a molten potassium salt, and as the potassium salt, potassium nitrate or a mixed salt of potassium nitrate and sodium nitrate is used.

In such ion exchange treatment, ion exchange of Na in the glass with potassium (K) in the molten salt is carried out. Therefore, if the ion exchange treatment is repeated by using the same molten salt, the Na concentration in the molten salt increases.

If the Na concentration in the molten salt increases, the surface compressive stress S of the chemically tempered glass decreases, and therefore, there has been a problem that it is necessary to strictly watch the Na concentration in the molten salt and to frequently carry out replacement of the molten salt, so that S of the chemically tempered glass will not become lower than the desired value.

It is desired to reduce the frequency of such replacement of the molten salt, and the glass α of the present invention is one of embodiments of the present invention suitable to solve such problems.

The present inventors have considered that there may be a relation between the composition of Na-containing glass and such a phenomenon that by repeating ion exchange treatment of immersing the Na-containing glass in a molten potassium salt many times to obtain chemically tempered glass, the Na concentration in the molten potassium salt increases and at the same time, the surface compressive stress of the chemically tempered glass becomes small, and have conducted the following experiment.

Firstly, 29 types of glass plates were prepared which had compositions as represented by mole percentage in Tables 1 to 3 and each of which had a thickness of 1.5 mm and a size of 20 mm×20 mm and had both sides mirror-polished with cerium oxide. The glass transition points Tg (unit: ° C.) of these glasses are shown in the same Tables. Here, those provided with * are ones calculated from the compositions.

These 29 types of glass plates were subjected to ion exchange of immersing for 10 hours in a molten potassium salt having a $KNO_3$ content of 100% and having a temperature of 400° C. to obtain chemically tempered glass plates, whereupon their surface compressive stresses CS1 (unit: MPa) were measured. Here, glass A27 is glass used for a cover glass for a mobile device.

Further, these 29 types of glass plates were subjected to ion exchange of immersing for 10 hours in a molten potassium salt having a $KNO_3$ content of 95% and a $NaNO_3$ content of 5% and having a temperature of 400° C. to obtain chemically tempered glass plates, whereupon their surface compressive stresses CS2 (unit: MPa) were measured.

CS1 and CS2 are shown together with their ratio r=CS2/CS1 in the corresponding rows in Tables 1 to 3. r of conventional cover glass A27 is 0.65.

TABLE 1

| Glass | α1 | α2 | A1 | A2 | A3 | A4 | A5 | A6 | A7 | A8 |
|---|---|---|---|---|---|---|---|---|---|---|
| $SiO_2$ | 73.0 | 72.0 | 64.3 | 64.3 | 64.3 | 64.3 | 63.8 | 63.8 | 64.3 | 64.3 |
| $Al_2O_3$ | 7.0 | 6.0 | 6.5 | 7.0 | 6.5 | 7.0 | 7.0 | 7.5 | 6.0 | 6.0 |
| MgO | 6.0 | 10.0 | 11.0 | 11.0 | 11.0 | 11.0 | 11.0 | 11.0 | 11.5 | 12.0 |
| CaO | 0 | 0 | 0.1 | 0.1 | 0.1 | 0.1 | 0.1 | 0.1 | 0.1 | 0.1 |
| SrO | 0 | 0 | 0.1 | 0.1 | 0.1 | 0.1 | 0.1 | 0.1 | 0.1 | 0.1 |
| BaO | 0 | 0 | 0.1 | 0.1 | 0.1 | 0.1 | 0.1 | 0.1 | 0.1 | 0.1 |
| $ZrO_2$ | 0 | 0 | 2.0 | 1.5 | 1.5 | 1.0 | 1.5 | 1.0 | 2.0 | 1.5 |
| $Na_2O$ | 14.0 | 12.0 | 12.0 | 12.0 | 12.5 | 12.5 | 12.5 | 12.5 | 12.0 | 12.0 |
| $K_2O$ | 0 | 0 | 4.0 | 4.0 | 4.0 | 4.0 | 4.0 | 4.0 | 4.0 | 4.0 |
| Tg | 617 | 647 | 615 | 617 | 608 | 603 | 614 | 610 | 615 | 609 |
| CS1 | 888 | 900 | 1049 | 1063 | 1035 | 1047 | 1063 | 1046 | 1020 | 1017 |
| CS2 | 701 | 671 | 589 | 593 | 601 | 590 | 601 | 599 | 588 | 579 |
| r | 0.79 | 0.75 | 0.56 | 0.56 | 0.58 | 0.56 | 0.57 | 0.57 | 0.58 | 0.57 |
| R | 0.76 | 0.72 | 0.55 | 0.56 | 0.56 | 0.56 | 0.56 | 0.56 | 0.55 | 0.55 |

TABLE 2

| Glass | A9 | A10 | A11 | A12 | A13 | A14 | A15 | A16 | A17 | A18 |
|---|---|---|---|---|---|---|---|---|---|---|
| $SiO_2$ | 64.3 | 64.3 | 64.3 | 64.3 | 64.3 | 65.3 | 64.3 | 60.3 | 56.3 | 64.3 |
| $Al_2O_3$ | 7.2 | 7.0 | 6.0 | 6.0 | 8.0 | 7.0 | 10.0 | 11.5 | 15.5 | 8.0 |
| MgO | 11.0 | 11.0 | 12.5 | 13.0 | 11.0 | 11.0 | 8.5 | 11.0 | 11.0 | 10.5 |
| CaO | 0.1 | 0.1 | 0.1 | 0.1 | 0.1 | 0.1 | 0.1 | 0.1 | 0.1 | 0.1 |
| SrO | 0.1 | 0.1 | 0.1 | 0.1 | 0.1 | 0.1 | 0.1 | 0.1 | 0.1 | 0.1 |
| BaO | 0.1 | 0.1 | 0.1 | 0.1 | 0.1 | 0.1 | 0.1 | 0.1 | 0.1 | 0.1 |
| $ZrO_2$ | 0.5 | 1.5 | 1.0 | 0.5 | 0.5 | 0.5 | 0 | 0 | 0 | 0.5 |
| $Na_2O$ | 12.7 | 11.5 | 12.0 | 12.0 | 12.0 | 12.0 | 13.0 | 13.0 | 13.0 | 12.5 |
| $K_2O$ | 4.0 | 4.5 | 4.0 | 4.0 | 4.0 | 4.0 | 4.0 | 4.0 | 4.0 | 4.0 |
| Tg | 597 | 612* | 610* | 610* | 614 | 610* | 620* | 630* | 670* | 608 |
| CS1 | 1003 | 1013 | 984 | 963 | 954 | 983 | 1072 | 1145 | 1221 | 1024 |
| CS2 | 588 | 564 | 561 | 546 | 576 | 574 | 640 | 641 | 647 | 582 |
| r | 0.59 | 0.56 | 0.57 | 0.57 | 0.60 | 0.58 | 0.60 | 0.56 | 0.53 | 0.57 |
| R | 0.57 | 0.54 | 0.55 | 0.55 | 0.56 | 0.57 | 0.59 | 0.54 | 0.51 | 0.57 |

TABLE 3

| Glass | A19 | A20 | A21 | A22 | A23 | A24 | A25 | A26 | A27 |
|---|---|---|---|---|---|---|---|---|---|
| $SiO_2$ | 64.3 | 63.5 | 66.0 | 64.5 | 65.0 | 63.5 | 64.3 | 71.3 | 66.7 |
| $Al_2O_3$ | 8.5 | 10.5 | 9.0 | 9.0 | 5.0 | 5.0 | 6.0 | 2.0 | 10.8 |
| MgO | 10.5 | 9.0 | 8.0 | 12.0 | 12.0 | 8.0 | 11.0 | 10.4 | 6.2 |
| CaO | 0.1 | 0 | 0 | 0 | 0.5 | 4.0 | 0.1 | 0.3 | 0.6 |
| SrO | 0.1 | 0 | 0 | 0 | 0 | 0 | 0.1 | 0.03 | 0 |
| BaO | 0.1 | 0 | 0 | 0 | 0 | 0 | 0.1 | 0.02 | 0 |
| $ZrO_2$ | 0 | 0 | 0 | 0 | 0 | 1.3 | 2.5 | 0.5 | 0 |
| $Na_2O$ | 12.5 | 15.0 | 15.0 | 11.5 | 11.0 | 9.4 | 12.0 | 10.8 | 13.2 |
| $K_2O$ | 4.0 | 2.0 | 2.0 | 3.0 | 6.5 | 8.9 | 4.0 | 4.6 | 2.4 |
| Tg | 610* | 630* | 610* | 650* | 570* | 580* | 620 | 580* | 595 |
| CS1 | 985 | 1190 | 1054 | 919 | 746 | 668 | 1019 | 664 | 1039 |
| CS2 | 577 | 752 | 722 | 516 | 382 | 240 | 571 | 407 | 679 |
| r | 0.59 | 0.63 | 0.69 | 0.56 | 0.51 | 0.36 | 0.56 | 0.61 | 0.65 |
| R | 0.57 | 0.64 | 0.66 | 0.58 | 0.50 | 0.35 | 0.55 | 0.59 | 0.64 |

Figure 1:
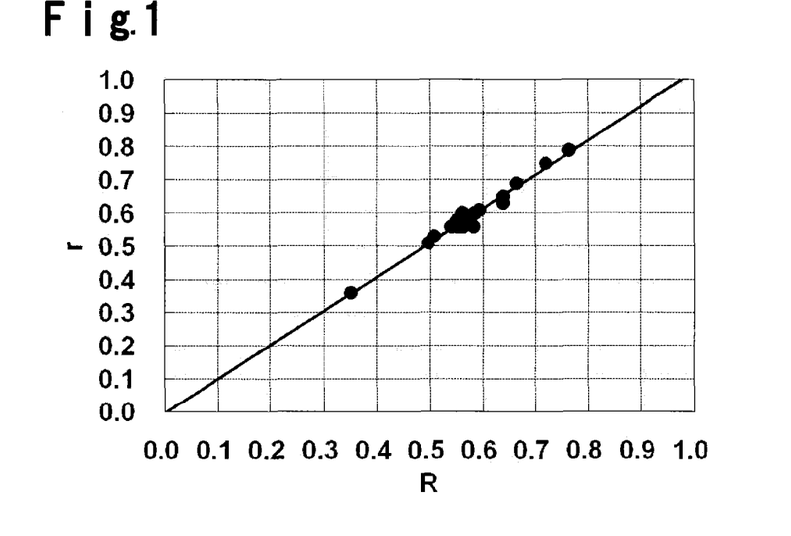
FIG. 1 is a graph showing the relation between R obtained by calculation from the glass composition and the decrease ratio r of the surface compressive stress due to an increase of the Na concentration in the molten potassium salt.

From these results, it has been found that there is a high correlation between R calculated by the above formula (shown in the bottom rows in Tables 1 to 3) and the above r. FIG. 1 is a scatter graph to make this point clear wherein the abscissa represents R and the ordinate represents r, and the straight line in the Fig. represents r=1.027×R−0.0017. The correlation coefficient is 0.97.

From the above correlation found by the present inventors, the following is evident. That is, in order to reduce the frequency of replacement of the molten salt, glass having a less degree of decrease in S due to an increase of the Na concentration in the molten salt i.e. glass having the above r being large, may be used, and for such a purpose, the above R of the glass may be made to be large.

The glass α of the present invention is achieved by such discoveries.

By making R being at least 0.66, the above r can be made to be at least 0.66 and as a result, it is possible to ease controls of the Na concentration in the molten salt as compared with conventional one, or it is possible to reduce the frequency of replacement of the molten salt. R is preferably at least 0.68.

Further, when glasses α1 and α2 having r being largest among 29 types of glasses, are compared with the other 27 types of glasses, they are common in that they contain no $K_2O$. On the other hand, the coefficient relating to $K_2O$ in the above formula for calculation of R is 0 and is substantially small as compared with the coefficient of 0.029 relating to $Na_2O$ being the same alkali metal oxide, and this explains such a point.

Accordingly, from such a viewpoint, the glass of the present invention preferably contains no $K_2O$, and as such glass, the following glass may be mentioned. That is, it is glass for chemical tempering which comprises, as represented by mole percentage based on the following oxides, at most 77% of $SiO_2$, at least 3% of MgO, from 0 and less than 1% of CaO and at least 8% of $Na_2O$, has a total content of $SiO_2$ and $Al_2O_3$ of at most 85%, and contains no $K_2O$.

Now, the composition of the glass of the present invention will be described by using contents represented by mole percentage unless otherwise specified.

$SiO_2$ is a component to constitute a glass matrix and is essential, and is a component to reduce formation of cracking when the glass surface has flaws (indentations) or to reduce the breakage ratio when indentations are impressed after chemical tempering. If the $SiO_2$ content is less than 65%, stability or weather resistance of the glass or the chipping resistance tends to decrease, and when the $SiO_2$ content is at least 65%, a change in the surface compressive stress due to a $NaNO_3$ concentration in the $KNO_3$ molten salt can be made small. The $SiO_2$ content is preferably at least 68%, more preferably at least 70%. If the $SiO_2$ content exceeds 85%, the viscosity of the glass tends to increase thereby to lower the melting property, and it is preferably at most 80%, more preferably at most 77%, particularly preferably at most 75%. In the glass α of the present invention, the $SiO_2$ content is considered to be at most 77%, and is preferably at most 76%, more preferably at most 75%.

$Al_2O_3$ is a component to improve the ion exchange performance and the chipping resistance, or to reduce the breakage ratio when indentations are impressed after chemical tempering. If the $Al_2O_3$ content is less than 3%, no desired surface compressive stress or the compressive stress layer thickness will be obtained by ion exchange. It is preferably at least 4%, more preferably at least 4.5%, particularly preferably at least 5%. If the $Al_2O_3$ content exceeds 15%, the viscosity of the glass tends to be high, whereby homogeneous melting tends to be difficult. Further, when the $Al_2O_3$ content is at most 15%, a change in the surface compressive stress due to a $NaNO_3$ concentration in the $KNO_3$ molten salt can be made small. The $Al_2O_3$ content is preferably at most 12%, more preferably at most 11%, further preferably at most 10%, particularly preferably at most 9%, typically at most 8%. In a case where a stress relaxation when chemical tempering treatment is carried out is to be suppressed, the $Al_2O_3$ content is preferably at most 6%. If the $Al_2O_3$ content exceeds 6%, it is necessary that a larger amount of $Na_2O$ is contained to maintain the melting property of the glass and as a result, the above stress relaxation is likely to occur.

If the total content $SiO_2+Al_2O_3$ of $SiO_2$ and $Al_2O_3$ exceeds 88%, the viscosity of the glass at high temperature tends to increase and the melting tends to be difficult, and it is preferably at most 85%, more preferably at most 83%. Further, the total content $SiO_2+Al_2O_3$ is preferably at least 75%. If the total content $SiO_2+Al_2O_3$ is less than 75%, the crack resistance when the glass surface has indentations tends to decrease, and it is more preferably at least 77%.

$Na_2O$ is a component to form a surface compressive stress layer by ion exchange and to improve the melting property of the glass, and is essential. If the $Na_2O$ content is less than 5%, it tends to be difficult to form a desired surface compressive stress layer by ion exchange, and it is preferably at least 8%. In a case where a change in the surface compressive stress due to a $NaNO_3$ concentration in the $KNO_3$ molten salt is to be made small, the $Na_2O$ content is preferably at least 8%, and in the glass α of the present invention, the $Na_2O$ content is considered to be at least 8%, and is preferably at least 9%, more preferably at least 10%, further preferably at least 11%, particularly preferably at least 12%. If the $Na_2O$ content exceeds 15%, the weather resistance tends to decrease, or cracking is likely to be formed from an indentation.

$K_2O$ is not essential but is a component to increase the ion exchange rate, and thus, it may be contained in a range of less than 2%. If its content is at least 2%, cracking is likely to be formed from an indentation, or the change in the surface compressive stress due to a $NaNO_3$ concentration in the $KNO_3$ molten salt becomes large. The $K_2O$ content is preferably at most 1.9%, more preferably at most 1%, typically at most 0.8%. As described above, in a case where the change in the surface compressive stress due to a $NaNO_3$ concentration in the $KNO_3$ molten salt is to be made small, it is preferred that no $K_2O$ is contained.

MgO is a component which may decrease the ion exchange rate and is not essential, but is a component to suppress cracking and to improve the melting property, and may be contained up to 15%. If the MgO content is less than 3%, the viscosity tends to increase and it is highly possible that the melting property decreases, and from such a viewpoint, MgO is contained preferably in a content of at least 3%, more preferably at least 4%, particularly preferably at least 5%. In the glass α of the present invention, the MgO content is considered to be at least 3%. In a case where the stress relaxation is to be suppressed, the MgO content is preferably at least 8%. If the MgO content is less than 8%, the degree of the stress relaxation tends to vary depending upon the location in a chemical tempering treatment tank due to dispersion of the molten salt temperature when chemical tempering treatment is carried out and as a result, it may be difficult to obtain a stable compressive stress. If the MgO content exceeds 15%, the glass is likely to devitrify, or the change in the surface compressive stress due to a $NaNO_3$ concentration in the $KNO_3$ molten salt tends to be large, and the MgO content is preferably at most 12%. In the glass α of the present invention, the MgO content is more preferably at most 11%, further preferably at most 10%, particularly preferably at most 8%, typically at most 7%.

The total content of $SiO_2$, $Al_2O_3$, $Na_2O$ and MgO is preferably at least 98%. If the total content is less than 98%, it may be difficult to obtain a desired compressive stress layer while maintaining the chipping resistance. It is typically at least 98.3%.

$ZrO_2$ is not essential, but may be contained up to 1% so as to lower the viscosity at high temperature or to increase the surface compressive stress. If the $ZrO_2$ content exceeds 1%, cracking is likely to be formed from an indentation.

In a case where the $SiO_2$ content is at most 72%, the $ZrO_2$ content is preferably at most 0.63%. If the $ZrO_2$ content exceeds 0.63%, the glass is likely to be broken when it gets an indentation after chemical tempering, and from such a viewpoint, it is more preferred that no $ZrO_2$ is contained in such a case.

The glass of the present invention essentially comprises the above-described components, but may contain other components within a range not to impair the object of the present invention. In a case where such other components are contained, the total content of such components is preferably at most 5%, more preferably at most 3%, typically at most 1%. Now, such other components will be exemplified.

ZnO may be contained up to 2% for example in some cases, in order to improve the melting property of glass at a high temperature, but its content is preferably at most 1%, and preferably at most 0.5% in a case of production by a float process. If the ZnO content exceeds 0.5%, it is likely to be reduced during the float forming to form a product defect. Typically no ZnO is contained.

$B_2O_3$ may be contained within a range less than 1% for example in some cases, in order to improve the melting property of glass at a high temperature. If the $B_2O_3$ content is at least 1%, homogeneous glass tends to be hardly obtainable, and the glass forming may be difficult, or the chipping resistance may deteriorate. Typically no $B_2O_3$ is contained.

$TiO_2$ is likely to deteriorate the visible light transmittance and to color glass to be brown when it is coexistent with Fe ions in the glass, and therefore, its content is preferably at most 1% if contained, and typically, it is not contained.

$Li_2O$ is a component to lower the strain point and to bring about a stress relaxation thereby to make it difficult to stably obtain a surface compressive stress layer and therefore it is preferably not contained, and even if contained, its content is preferably less than 1%, more preferably at most 0.05%, particularly preferably less than 0.01%.

Further, $Li_2O$ may elute in a molten salt of e.g. $KNO_3$ at the time of the chemical tempering treatment in some cases, and if the chemical tempering treatment is carried out by using a molten salt containing Li, the surface compressive stress remarkably decrease. That is, the present inventors have found that when the glass in Example 23 described hereinafter was subjected to a chemical tempering treatment at 450° C. for 6 hours by using $KNO_3$ containing no Li and $KNO_3$ containing Li in contents of 0.005 mass %, 0.01 mass % and 0.04 mass %, the surface compressive stress remarkably decreased only when the molten salt contained 0.005 mass % of Li. That is, $Li_2O$ is preferably not contained from such a viewpoint.

CaO may be contained within a range less than 1% in order to improve the melting property at a high temperature or to prevent devitrification. If the CaO content is at least 1%, the ion exchange rate or the durability against cracking tends to decrease. Typically no CaO is contained.

SrO may be contained as the case requires, but it has a higher effect of lowering the ion exchange rate as compared with MgO and CaO, and therefore its content is preferably less than 1% even if contained. Typically no SrO is contained.

BaO has the highest effect of lowering the ion exchange rate among alkaline earth metal oxides, and therefore it is preferred that no BaO is contained or even if contained, its content is less than 1%.

In a case where SrO or BaO is contained, their total content is preferably at most 1%, more preferably less than 0.3%.

In a case where at least one of CaO, SrO, BaO and $ZrO_2$ is contained, the total content of these four components is preferably less than 1.5%. If the total content is at least 1.5%, the ion exchange rate may decrease, and it is typically at most 1%.

As a clarifying agent at the time of melting glass, $SO_3$, a chloride, a fluoride or the like may suitably be contained. However, in order to increase the visibility of display devices such as touch panels, it is preferred to reduce contamination by impurities such as $Fe_2O_3$, NiO or $Cr_2O_3$ having an absorption in a visible light range in raw materials as far as possible, and the content of each of them is preferably at most 0.15%, more preferably at most 0.05%, as represented by mass percentage.

Further, the glass for chemical tempering is preferably one which can be chemically tempered in a short time, and if it is attempted to carry out chemical tempering in a short time, it is necessary to increase the ion exchange temperature i.e. the temperature of the molten salt so as to increase the ion exchange rate. However, if the ion exchange temperature is increased, the surface compressive stress S formed by the chemical tempering is likely to decrease. Hereinafter in the present invention, this phenomenon is called a stress relaxation, and the above Δ which is an index of the stress relaxation is preferably at most 0.21 when the importance is placed on the stability of S. That is, the dispersion of S is required to be within 5%, and on the other hand, the fluctuation of the temperature of the molten salt in a chemical tempering treatment tank is ±6° C. and the fluctuation full width i.e. the dispersion is 12%, and therefore when Δ evaluated by a temperature difference of 50° C. (=450° C.-400° C.) is at most 0.21, the dispersion of S at 12° C. is 0.05=5% which is 12/50 thereof. Δ is more preferably at most 0.20, particularly preferably at most 0.19.

Figure 2:
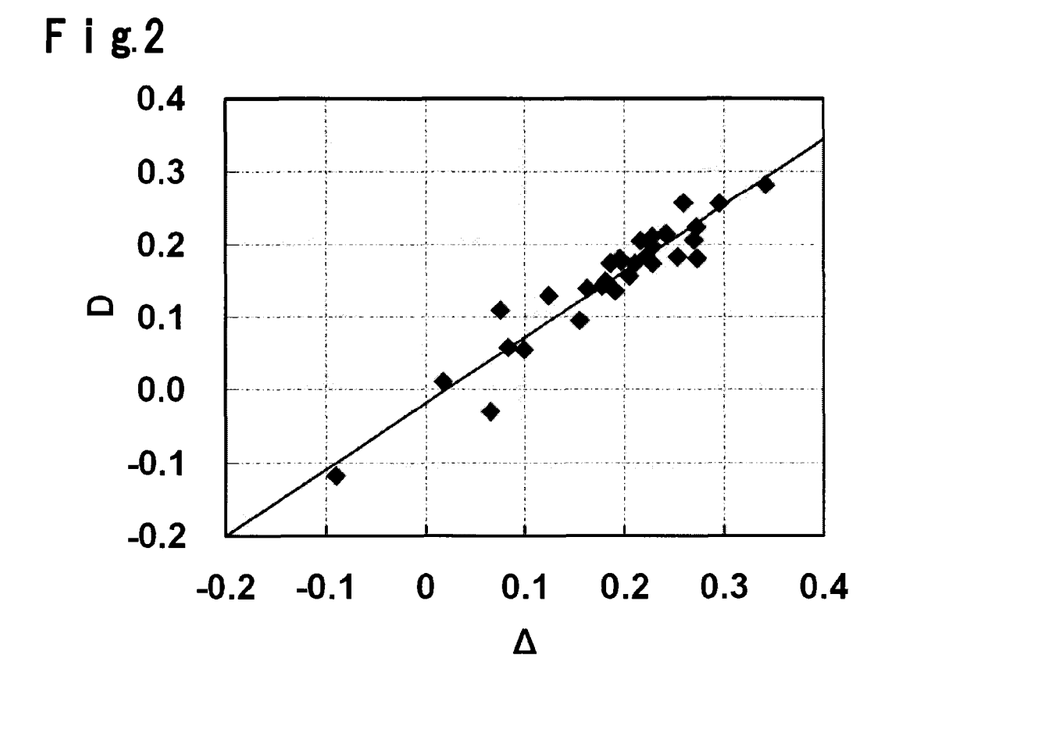
FIG. 2 is a graph showing the relation between D obtained by calculation from the glass composition and the decrease ratio i.e. the stress relaxation ratio Δ of the surface compressive stress obtainable when glass is immersed in a molten potassium nitrate salt at 400° C. and at 450° C. for 6 hours.

The present inventors have further found that Δ varies depending upon the glass composition, and achieved glass β of the present invention. FIG. 2 is a scatter graph illustrating the relation between the above D calculated from the compositions of glasses in Examples 1 to 12, 31 to 43, 57 and 59 to 62 described hereinafter and Δ of the respective glasses. The straight line in the Fig. represents D=0.911×Δ−0.018, and the correlation coefficient is 0.91. That is, when D is at most 0.18, it is possible that Δ is substantially at most 0.21. D is preferably at most 0.17, more preferably at most 0.16.

In a case where Δ is to be made small, the glass of the present invention preferably comprises, as represented by mole percentage, from 70 to 75% of $SiO_2$, from 5.5 to 8.5% of $Al_2O_3$, from 12 to 15% of $Na_2O$, from 0 to 1% of $K_2O$, higher than 7% and at most 9% of MgO and from 0 to 0.5% of $ZrO_2$, and has a total content $SiO_2+Al_2O_3$ of $SiO_2$ and $Al_2O_3$ of at most 83%. CaO is a component which is likely to inhibit the ion exchange and make it difficult to obtain a sufficient t, and is a component which promotes cracking when an indenter is pressed, and from such viewpoints, it is preferably not contained, and even if contained, its content is preferably less than 1%.

EXAMPLES

In Examples 1 to 16, 23 to 26, 28, 29 and 31 to 62 in Tables 4 to 11, glass raw materials which are commonly employed, such as oxides, hydroxides, carbonates and nitrates, were properly selected to have compositions as represented by mole percentage in columns for $SiO_2$ to $K_2O$ and weighed to obtain 400 g of glass. To these weighed glass raw materials, sodium sulfate in a mass corresponding to 0.2% of their mass was added, and they were mixed. Then, the mixed raw materials were put in a platinum crucible, the platinum crucible was put in a resistance heat type electric furnace at 1,650° C., and the mixture was melted for 5 hours and refined and homogenized. The obtained molten glass was cast into a mold, held for one hour at a temperature of Tg+50° C. and then cooled to room temperature at a rate of 0.5° C./min to obtain a glass block. This glass block was cut and polished and finally their both surfaces were mirror-polished to obtain a plate glass having a size of 30 mm×30 mm and a thickness of 1.0 mm.

Example 27 in Table 7 corresponds to soda lime glass separately prepared, and in Examples 17 and 18 in Table 5, Examples 19 to 22 in Table 6 and Example 30 in Table 7, no melting of glass and the like as described above were conducted.

Examples 1 to 22 and 30 to 62 are Examples of the present invention, and Examples 23 to 29 are Comparative Examples.

For reference, the compositions of glasses in Examples 1 to 62 as represented by mass percentage are shown in Tables 12 to 19.

With respect to these glasses, the glass transition point Tg (unit: °C.), the temperature T2 (unit: °C.) at which the viscosity becomes $10^2$ dPa·s, the temperature T4 (unit: °C.) at which the viscosity becomes $10^4$ dPa·s, the specific gravity ρ, the average linear expansion coefficient α (unit: $^{-7}/°$ C.) at from 50 to 350° C., the Young's modulus E (unit: GPa), the Poisson's ratio σ, the cracking probability $P_0$ (unit: %) when not tempered, the above r, the above R, the above Δ and the above D are shown in Tables. Data with * in Tables are values obtained by calculation or assumption from the compositions.

$P_0$ is a cracking probability when a load of 500 gf (=4.9 N) was applied by using a Vickers hardness meter and measured as follows.

A plate glass was ground by means of a #1000 grinder for from 300 to 1,000 μm to obtain a plate glass, which was polished by means of cerium oxide to obtain mirror surfaces. Then, in order to remove the processing strain on the mirror surfaces, the plate glass was heated to a temperature of Tg+50° C. in a resistance heat type electric furnace under the atmospheric pressure, held at this temperature for one hour and then cooled to room temperature at a rate of 0.5° C./min. The heating was conducted at a heating rate such that the temperature achieved Tg in one hour.

Using the above treated sample, the cracking probability was measured. That is, a Vickers indenter was pressed at ten points with a load of a Vickers hardness meter of 500 g in the air atmosphere at a temperature of from 20 to 28° C. at a dew point of −30° C., and the number of cracks formed at four corners of indentations was measured. The number of such cracks was divided by the possible number of cracks being 40 to obtain the cracking probability.

The cracking probability of glass when not tempered is preferably lower. Specifically, $P_0$ is preferably at most 50%. With respect to the glasses in Examples of the present invention, $P_0$ does not exceed 50% in each Example, and it is found that cracking is less likely to form even in a non-tempered state.

Then, the plate glasses in Examples 1 to 16, 23 to 29 and 59 to 62 were subjected to the following chemical tempering treatment. That is, each glass was immersed in a $KNO_3$ molten salt at 400° C. for 8 hours to carry out a chemical tempering treatment. In the $KNO_3$ molten salt, the $KNO_3$ content was from 99.7 to 100%, and the $NaNO_3$ content was from 0 to 0.3%.

With respect to each glass after the chemical tempering treatment, the surface compressive stress S (unit: MPa) and the compressive stress layer depth t (unit: μm) were measured by means of a surface stress meter FSM-6000 manufactured by Orihara Manufacturing Co., Ltd. The results are shown in the corresponding rows in Tables.

Further, with respect to the plate glasses in Examples 31 to 58, the surface compressive stress and the compressive stress layer depth were measured in the same manner with times of immersion in the $KNO_3$ molten salt at 400° C. of 6 hours and 10 hours, and from these values, the surface compressive stress and the compressive stress layer depth when the above immersion time was 8 hours were estimated. The results are shown in columns for S and t in the Tables.

Further, with respect to 20 sheets each of the plate glasses after the chemical tempering treatment in Examples 1 to 18 and 23 to 29 and 20 sheets of the plate glasses after the chemical tempering treatment for 10 hours (the above chemical tempering treatment wherein the time of immersion in the $KNO_3$ molten salt at 400° C. was 10 hours) in Examples 31 to 62, a Vickers indenter of a Vickers hardness meter was pressed under 5 kgf i.e. 49 N in the atmospheric pressure at a temperature of from 20 to 28° C. under a humidity of from 40 to 60%, and the number of breakage originating from the indentation was divided by the number of the plates measured being 20 and represented by percentage, to obtain the breakage ratio $P_1$ (unit: %). Further, the breakage ratio $P_2$ (unit: %) differing from $P_1$ only in that the Vickers indenter was pressed under 10 kgf i.e. 98 N was measured in the same manner as $P_1$. $P_1$ and $P_2$ are respectively preferably at most 50% and at most 40%.

In Examples 1 to 15, 17, 18 and 31 to 62 of the present invention, the glasses were not broken at all and $P_1$ was 0%, and even in Example 16 in which $P_1$ was not 0%, both $P_1$ and $P_2$ were only 40%, whereas in Comparative Examples 24 to 29, $P_1$ or $P_2$ exceeded 40%, and particularly with respect to the glasses in Examples 27 to 29, both $P_1$ and $P_2$ were 100% and all the glasses were broken. That is, it is found that the glass of the present invention has a low risk of breakage even when it has an indentation. In Comparative Examples 23 and 26, $P_1$ was at most 40%, but $P_0$ was so high as exceeding 50% in these Comparative Examples.

Further, with respect to the glasses in Examples 1, 8 and 27 to 29, glasses having a size of 5 mm×40 mm×1 mm thickness and having the surfaces of 5 mm×40 mm mirror-polished and having the other sides processed to #1000 finish, were separately prepared. These glasses were subjected to a chemical tempering treatment at from 425 to 450° C. by using a potassium nitrate molten salt ($KNO_3$: 98 to 99.8%, $NaNO_3$: 0.2 to 2%). The surface compressive stress and the compressive stress layer depth were 757 MPa and 55 μm in Example 1, 878 MPa and 52 μm in Example 8, 607 MPa and 15 μm in Example 27, 790 MPa and 49 μm in Example 28, and 830 MPa and 59 μm in Example 29, respectively.

On the center of the mirror-polished surface of 5 mm×40 mm of each of the glasses after the chemical tempering treatment, a Vickers indenter was pressed under a load of 10 kgf by using a Vickers hardness meter to form an indentation. The glasses in Comparative Examples 27 to 29 were broken when the indentation was formed, but the glasses in Examples 1 and 8 were not broken.

By using the samples in Examples 1 and 8 with an indentation of 10 kgf, a three point bending test was carried out with a span of 30 mm so that the surface with the indentation was pulled. The average bending strength (unit: MPa) with n=20 is shown in the column for F in Table 4. Chemically tempered glasses in Examples 1 and 8 showed a very high breaking stress of at least 400 MPa even in a state where the indentation was formed.

Δ was measured as follows. That is, ion exchange of immersing the glass in molten potassium nitrate having a $KNO_3$ content of 100% and a temperature of 400° C. for 6 hours was carried out to prepare a chemically tempered glass plate, and the surface compressive stress $S_{400}$ (unit: MPa) was measured. Further, ion exchange of immersing the glass in molten potassium nitrate having a $KNO_3$ content of 100% and a temperature of 450° C. for 6 hours was carried out to prepare a chemically tempered glass plate, and the surface compressive stress $S_{450}$ (unit: MPa) was measured. From $S_{400}$ and $S_{450}$ thus measured, $(S_{400}-S_{450})/S_{400}$ was calculated and regarded as Δ.

TABLE 4

| | Ex. | | | | | | | | |
|---|---|---|---|---|---|---|---|---|---|
| | 1 | 2 | 3 | 4 | 5 | 6 | 7 | 8 | 9 |
| $SiO_2$ | 73.0 | 75.5 | 73.0 | 73.0 | 73.0 | 73.0 | 73.2 | 72.0 | 72.0 |
| $Al_2O_3$ | 7.0 | 4.9 | 5.0 | 5.0 | 7.0 | 7.0 | 7.0 | 6.0 | 7.0 |
| MgO | 6.0 | 5.9 | 8.0 | 10.0 | 5.5 | 5.5 | 5.5 | 10.0 | 10.0 |
| CaO | 0 | 0 | 0 | 0 | 0 | 0 | 0 | 0 | 0 |
| $ZrO_2$ | 0 | 0 | 0 | 0 | 0.5 | 0.5 | 0.3 | 0 | 0 |
| $Na_2O$ | 14.0 | 13.7 | 14.0 | 12.0 | 14.0 | 14.0 | 14.0 | 12.0 | 11.0 |
| $K_2O$ | 0 | 0 | 0 | 0 | 0 | 0 | 0 | 0 | 0 |
| Tg | 617 | 586 | 600 | 632 | 625 | 617 | 620 | 647 | 674 |
| T2 | 1734 | 1680* | 1642* | 1652* | 1696* | 1721* | 1710* | 1711 | 1687* |
| T4 | 1256 | 1195* | 1170* | 1187* | 1214* | 1206* | 1203* | 1256 | 1225* |
| ρ | 2.405 | 2.392 | 2.408 | 2.410 | 2.417 | 2.409 | 2.424 | 2.412 | 2.409 |
| α | 79 | 78 | 80 | 72 | 77.25 | 77.26 | 77.74 | 71.71 | 68 |
| E | 70.8 | 69.7 | 70.6 | 72.9 | 73 | 72.3 | 74.6 | 73.1 | 72.8 |
| σ | 0.204 | 0.203 | 0.207 | 0.207 | 0.226 | 0.23 | 0.218 | 0.207 | 0.226 |
| $P_0$ | 10 | 10 | 0 | 0 | 10 | 0 | 5 | 0 | 7.5 |
| S | 909 | 699 | 821 | 918 | 931 | 864 | 878 | 943 | 915 |
| t | 33 | 34 | 30 | 23 | 33 | 35 | 33 | 24 | 23 |
| $P_1$ | 0 | 0 | 0 | 0 | 0 | 0 | 0 | 0 | 0 |
| $P_2$ | 0 | 0 | 0 | 0 | 0 | 0 | 0 | 0 | 0 |
| F | 495 | 445* | 505* | 552* | 559* | 526* | 533* | 565 | 550* |
| r | 0.79 | 0.84 | 0.80 | 0.71 | 0.79 | 0.80 | 0.79 | 0.75 | 0.71 |
| R | 0.76 | 0.78 | 0.75 | 0.73 | 0.76 | 0.76 | 0.77 | 0.72 | 0.71 |
| Δ | 0.196 | 0.294 | 0.253 | 0.154 | 0.186 | 0.228 | 0.222 | 0.082 | 0.017 |
| D | 0.177 | 0.256 | 0.183 | 0.095 | 0.256 | 0.256 | 0.224 | 0.058 | 0.011 |

TABLE 5

| | Ex. | | | | | | | | |
|---|---|---|---|---|---|---|---|---|---|
| | 10 | 11 | 12 | 13 | 14 | 15 | 16 | 17 | 18 |
| $SiO_2$ | 72.0 | 72.0 | 72.0 | 71.7 | 71.4 | 70.0 | 70.1 | 73.0 | 77.9 |
| $Al_2O_3$ | 7.0 | 6.0 | 6.0 | 7.1 | 8.2 | 9.0 | 6.0 | 9.0 | 4.8 |
| MgO | 9.0 | 12.0 | 14.0 | 8.1 | 6.1 | 7.0 | 10.3 | 6.0 | 5.8 |
| CaO | 0 | 0 | 0 | 0 | 0 | 0 | 0 | 0 | 0 |
| $ZrO_2$ | 0 | 0 | 0 | 0 | 0 | 0 | 0.63 | 0 | 0 |
| $Na_2O$ | 12.0 | 10.0 | 8.0 | 13.1 | 14.3 | 14.0 | 12.0 | 12.0 | 11.5 |
| $K_2O$ | 0 | 0 | 0 | 0 | 0 | 0 | 1.0 | 0 | 0 |
| Tg | 660 | 678 | 701 | 635* | 629* | 640* | 634* | 612* | 628* |
| T2 | 1682* | 1669* | 1679* | 1674* | 1689* | 1687* | 1638* | 1744* | 1727* |
| T4 | 1216* | 1214* | 1231* | 1205* | 1214* | 1219* | 1187* | 1271* | 1236* |
| ρ | 2.410 | 2.415 | 2.419 | 2.41* | 2.41* | 2.42* | 2.44* | 2.40* | 2.37* |
| α | 72 | 65 | 57 | 78* | 81* | 81* | 79* | 72* | 70* |
| E | 72.3 | 74.3 | 73.3 | 73* | 73* | 74* | 74* | 71* | 69* |
| σ | 0.23 | 0.218 | 0.207 | 0.20* | 0.20* | 0.20* | 0.20* | 0.20* | 0.20* |
| $P_0$ | 15 | 10 | 15 | 22.5 | 32.5 | 35 | 25 | 0* | 0* |
| S | 974 | 853 | 667 | 983 | 970 | 1101 | 928 | 1069* | 749* |
| t | 25 | 18 | 15 | 31 | 36 | 33 | 27 | 17* | 27* |
| $P_1$ | 0 | 0 | 0 | 0 | 0 | 0 | 40 | 0 | 0 |
| $P_2$ | 0 | 0 | 0 | 0 | 0 | 0 | 40 | 0 | 0 |
| F | 579* | 520* | 430* | 584* | 578* | 641* | 557* | 626* | 470* |
| r | 0.74 | 0.69 | 0.74 | 0.75 | 0.77 | 0.74 | 0.70 | — | — |
| R | 0.73 | 0.69 | 0.67 | 0.74 | 0.75 | 0.74 | 0.68 | 0.75 | 0.78 |
| Δ | 0.099 | 0.065 | −0.090 | | | | | | |
| D | 0.055 | −0.030 | −0.118 | 0.095 | 0.133 | 0.069 | 0.249 | 0.083 | 0.241 |

TABLE 6

| Ex. | 19 | 20 | 21 | 22 |
|---|---|---|---|---|
| $SiO_2$ | 65.0 | 70.1 | 84 | 80 |
| $Al_2O_3$ | 15.0 | 5 | 3 | 4 |
| MgO | 5.0 | 15 | 1 | 9 |
| CaO | 0 | 0 | 0 | 0 |
| $ZrO_2$ | 0 | 1 | 0 | 0 |
| $Na_2O$ | 15 | 7 | 12 | 6 |
| $K_2O$ | 0 | 1.9 | 0 | 1 |
| Tg | 647* | 665* | 571* | 650* |
| T2 | 1748* | 1650* | 1785* | 1617* |
| T4 | 1279* | 1215* | 1258* | 1780* |
| ρ | 2.44* | 2.45* | 2.33* | 2.35* |
| α | 83* | 66* | 79* | 54* |
| E | 74* | 79* | 66* | 73* |

TABLE 6-continued

| Ex. | 19 | 20 | 21 | 22 |
|---|---|---|---|---|
| σ | 0.20* | 0.20* | 0.17* | 0.18* |
| $P_0$ | 10* | 20* | 0* | 0* |
| S | 1200* | 960* | 1142* | 1037* |
| t | 34* | 30* | 28* | 20* |
| $P_1$ | 0* | 0* | 0* | 0* |
| $P_2$ | 0* | 0* | 0* | 0* |
| F | 690* | 573* | 662* | 611* |
| r | — | — | — | — |
| R | 0.71 | 0.59 | 0.86 | 0.72 |
| Δ | — | — | — | — |
| D | −0.075 | 0.232 | 0.475 | 0.229 |

TABLE 7

| | Ex. | | | | | | | |
|---|---|---|---|---|---|---|---|---|
| | 23 | 24 | 25 | 26 | 27 | 28 | 29 | 30 |
| $SiO_2$ | 71.1 | 68.3 | 66.4 | 66.0 | 72.0 | 64.5 | 66.6 | 77.0 |
| $Al_2O_3$ | 9.3 | 6.0 | 6.0 | 7.0 | 1.1 | 6.0 | 10.8 | 3.0 |
| MgO | 4.1 | 10.5 | 10.8 | 11.0 | 5.5 | 11.0 | 6.2 | 12.0 |
| CaO | 0 | 0 | 0 | 0 | 8.6 | 0 | 0.6 | 0 |
| $ZrO_2$ | 0 | 1.3 | 1.9 | 0 | 0 | 2.5 | 0 | 0 |
| $Na_2O$ | 15.5 | 12.0 | 12.0 | 12.0 | 12.6 | 12.0 | 13.2 | 8 |
| $K_2O$ | 0 | 2.0 | 3.0 | 4.0 | 0.2 | 4.0 | 2.4 | 0 |
| Tg | 623* | 629* | 623* | 596* | 540 | 620 | 590 | 660* |
| T2 | 1704* | 1614* | 1592* | 1609* | 1461 | 1575 | 1686* | 1688* |
| T4 | 1223* | 1178* | 1168* | 1170* | 1039 | 1168 | 1240* | 1221* |
| ρ | 2.41* | 2.47* | 2.50* | 2.46* | 2.49 | 2.53 | 2.46 | 2.38* |
| α | 84* | 83* | 87* | 93* | 87 | 91 | 93 | 60* |
| E | 73* | 74* | 75* | 74* | 73 | 78 | 73* | 76* |
| σ | 0.20* | 0.20* | 0.20* | 0.20* | 0.20* | 0.22 | 0.21* | 0.21* |
| $P_0$ | 70 | 60 | 82.5 | 82.5 | 90 | 82.5 | 60 | 0* |
| S | 943 | 974 | 894 | 831 | 713 | 987 | 843 | 985* |
| t | 40 | 29 | 27 | 37 | 10 | 34 | 37 | 25* |
| $P_1$ | 0 | 60 | 90 | 18 | 100 | 100 | 100 | 0* |
| $P_2$ | 0 | 100 | 100 | 60 | 100 | 100 | 100 | 0* |
| F | — | — | — | — | — | — | — | 585* |
| r | 0.80 | 0.66 | 0.61 | 0.62 | — | — | — | |
| R | 0.77 | 0.64 | 0.60 | 0.58 | 0.53 | 0.56 | 0.64 | 0.72 |
| Δ | | | | | 0.330 | 0.038 | 0.119 | |
| D | 0.171 | 0.441 | 0.632 | 0.479 | 1.481 | 0.824 | 0.410 | 0.061 |

TABLE 8

| | Ex. | | | | | | | | |
|---|---|---|---|---|---|---|---|---|---|
| | 31 | 32 | 33 | 34 | 35 | 36 | 37 | 38 | 39 |
| $SiO_2$ | 73.6 | 72.4 | 74.0 | 72.0 | 73.6 | 72.4 | 73.7 | 72.3 | 73.0 |
| $Al_2O_3$ | 6.5 | 7.5 | 7.0 | 7.0 | 7.0 | 7.0 | 8.1 | 5.9 | 8.0 |
| MgO | 6.0 | 6.0 | 5.0 | 7.0 | 6.0 | 6.0 | 4.0 | 7.9 | 6.0 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 13.9 | 14.1 | 14.0 | 14.0 | 13.4 | 14.6 | 14.1 | 13.9 | 13.0 |
| $K_2O$ | 0 | 0 | 0 | 0 | 0 | 0 | 0 | 0 | 0 |
| Tg | 613 | 628 | 613 | 623 | 626 | 603 | 625 | 612 | 654 |
| T2 | 1686* | 1690* | 1704* | 1672* | 1700.* | 1676* | 1724* | 1653* | 1716* |
| T4 | 1206* | 1213* | 1220* | 1199* | 1220* | 1199* | 1237* | 1182* | 1238* |
| ρ | 2.40* | 2.408 | 2.39* | 2.41 | 2.399 | 2.41* | 2.39* | 2.41* | 2.399 |
| α | 80* | 80* | 79* | 81* | 78* | 82* | 79* | 81* | 76* |
| E | 71* | 69.3 | 71* | 69.7 | 69.3 | 72* | 70* | 73* | 70 |
| σ | 0.2* | 0.2 | 0.2* | 0.2 | 0.2 | 0.2* | 0.2* | 0.2* | 0.2 |
| $P_0$ | 0* | 0* | 0* | 0* | 0* | 0* | 0* | 0* | 0* |
| S | 831 | 909 | 842 | 950 | 889 | 862 | 857 | 886 | 941 |
| t | 32 | 33 | 34 | 29 | 32 | 31 | 36 | 28 | 33 |
| $P_1$ | 0 | 0 | 0 | 0 | 0 | 0 | 0 | 0 | 0 |
| $P_2$ | 0 | 0 | 0 | 0 | 0 | 0 | 0 | 0 | 0 |
| F | 510* | 548* | 516* | 568* | 538* | 525* | 523* | 537* | 564* |
| r | 0.82 | 0.77 | 0.82 | 0.75 | 0.81 | 0.82 | 0.80 | 0.77 | 0.77 |
| R | 0.79 | 0.78 | 0.80 | 0.77 | 0.78 | 0.78 | 0.80 | 0.77 | 0.77 |
| Δ | 0.229 | 0.204 | 0.228 | 0.177 | 0.210 | 0.195 | 0.216 | 0.181 | 0.123 |
| D | 0.197 | 0.157 | 0.211 | 0.143 | 0.174 | 0.180 | 0.205 | 0.150 | 0.130 |

TABLE 9

| | Ex. | | | | | | | | |
|---|---|---|---|---|---|---|---|---|---|
| | 40 | 41 | 42 | 43 | 44 | 45 | 46 | 47 | 48 |
| $SiO_2$ | 73.0 | 72.6 | 73.4 | 71.7 | 74.3 | 71.0 | 72.3 | 72.6 | 72.0 |
| $Al_2O_3$ | 6.0 | 7.0 | 7.0 | 8.1 | 6.9 | 7.0 | 6.9 | 7.5 | 7.5 |
| MgO | 6.0 | 7.0 | 5.0 | 6.1 | 5.9 | 8.0 | 7.9 | 7.0 | 7.0 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 15.0 | 13.4 | 14.6 | 14.1 | 12.9 | 14.0 | 12.9 | 12.9 | 13.5 |
| $K_2O$ | 0 | 0 | 0 | 0 | 0 | 0 | 0 | 0 | 0 |
| Tg | 588 | 631 | 604 | 629 | 633 | 625 | 636 | 643 | 636 |
| T2 | 1660* | 1684* | 1692* | 1692* | 1712* | 1657* | 1681* | 1699* | 1687* |
| T4 | 1181* | 1210* | 1209* | 1217* | 1230* | 1189* | 1210* | 1224* | 1213* |
| ρ | 2.41* | 2.406 | 2.40* | 2.41* | 2.39* | 2.42* | 2.41* | 2.405 | 2.41 |
| α | 84* | 78* | 82* | 81* | 75* | 81* | 77* | 76* | 79* |
| E | 71* | 69.9 | 71* | 72* | 72* | 73* | 73* | 70.3 | 70 |
| σ | 0.2* | 0.2 | 0.2* | 0.2* | 0.2* | 0.2* | 0.2* | 0.2 | 0.2 |
| $P_0$ | 0* | 0* | 0* | 0* | 0* | 0* | 0* | 0* | 0* |
| S | 750 | 943 | 791 | 884 | 855 | 860 | 912 | 924 | 898 |
| t | 31 | 29 | 35 | 28 | 26 | 24 | 20 | 22 | 24 |
| $P_1$ | 0 | 0 | 0 | 0 | 0 | 0 | 0 | 0 | 0 |
| $P_2$ | 0 | 0 | 0 | 0 | 0 | 0 | 0 | 0 | 0 |
| F | 471* | 565* | 491* | 536* | 522* | 524* | 550* | 555* | 543* |
| r | | 0.75 | 0.81 | | | | | | |
| R | 0.79 | 0.77 | 0.79 | 0.77 | 0.78 | 0.76 | 0.76 | 0.77 | 0.76 |
| Δ | 0.271 | 0.162 | 0.241 | 0.190 | | | | | |
| D | 0.224 | 0.140 | 0.215 | 0.136 | 0.170 | 0.109 | 0.103 | 0.116 | 0.120 |

TABLE 10

| | Ex. | | | | | | | | |
|---|---|---|---|---|---|---|---|---|---|
| | 49 | 50 | 51 | 52 | 53 | 54 | 55 | 56 | 57 |
| $SiO_2$ | 71.6 | 73.6 | 72.0 | 72.2 | 72.0 | 72.0 | 72.5 | 73.0 | 72.5 |
| $Al_2O_3$ | 7.0 | 8.0 | 7.0 | 6.8 | 6.5 | 6.8 | 6.5 | 6.0 | 6.2 |
| MgO | 8.0 | 5.0 | 7.5 | 7.5 | 8.0 | 8.0 | 8.0 | 8.5 | 8.5 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 13.4 | 13.4 | 13.5 | 13.5 | 13.5 | 13.2 | 13.0 | 12.5 | 12.8 |
| $K_2O$ | 0 | 0 | 0 | 0 | 0 | 0 | 0 | 0 | 0 |
| Tg | 630 | 634 | 633* | 623 | 626 | 638* | 637* | 641* | 627 |
| T2 | 1669* | 1723* | 1721* | 1717* | 1701* | 1720* | 1724* | 1727* | 1717 |
| T4 | 1120* | 1240* | 1247* | 1242* | 1230* | 1249* | 1249* | 1251* | 1244 |
| ρ | 2.414 | 2.39* | 2.41 | 2.41 | 2.41 | 2.41 | 2.41 | 2.40 | 2.41 |
| α | 79* | 77* | 79* | 77 | 78 | 78* | 77* | 76* | 74 |
| E | 71.5 | 71* | 70 | 70 | 70 | 70 | 70 | 70 | 70 |
| σ | 0.2 | 0.2* | 0.2 | 0.2 | 0.2 | 0.2 | 0.2 | 0.2 | 0.2 |
| $P_0$ | 0* | 0* | 0* | 0* | 0* | 0* | 0* | 0* | 0* |
| S | 886 | 881 | 889 | 868 | 869 | 910 | 885 | 881 | 892 |
| t | 22 | 28 | 26 | 26 | 25 | 25 | 25 | 24 | 24 |
| $P_1$ | 0 | 0 | 0 | 0 | 0 | 0 | 0 | 0 | 0 |
| $P_2$ | 0 | 0 | 0 | 0 | 0 | 0 | 0 | 0 | 0 |
| F | 537* | 534* | 539* | 528* | 528* | 549* | 537* | 535* | 540* |
| r | | | | | | | | | 0.75 |
| R | 0.76 | 0.79 | 0.76 | 0.76 | 0.76 | 0.76 | 0.76 | 0.76 | 0.76 |
| Δ | | | | | | | | | 0.074 |
| D | 0.106 | 0.171 | 0.121 | 0.128 | 0.122 | 0.108 | 0.118 | 0.114 | 0.110 |

TABLE 11

| Ex. | 58 | 59 | 60 | 61 | 62 |
|---|---|---|---|---|---|
| $SiO_2$ | 72.7 | 72.55 | 73.94 | 72.98 | 73.5 |
| $Al_2O_3$ | 6.3 | 8.2 | 7.65 | 8.25 | 7.6 |
| MgO | 8.5 | 4.6 | 4.4 | 4.6 | 4.4 |
| CaO | 0 | 0.6 | 0 | 0 | 0.6 |
| $ZrO_2$ | 0 | 0 | 0 | 0 | 0 |
| $Na_2O$ | 12.5 | 14.1 | 13.98 | 14.19 | 13.9 |
| $K_2O$ | 0 | 0 | 0 | 0 | 0 |
| Tg | 639 | 629* | 625* | 628* | 626* |
| T2 | 1732* | 1706* | 1718* | 1716* | 1708* |
| T4 | 1258* | 1225* | 1232* | 1232* | 1224* |
| ρ | 2.40 | 2.41* | 2.39* | 2.40* | 2.40* |
| α | 74 | 80* | 79* | 80* | 79* |
| E | 71 | 71* | 71* | 71* | 71* |
| σ | 0.2 | 0.2* | 0.2* | 0.2* | 0.2* |
| $P_0$ | 0* | 0* | 0* | 0* | 0* |
| S | 913 | 859 | 811 | 853 | 817 |
| t | 24 | 31* | 33* | 32* | 32* |
| $P_1$ | 0 | 0 | 0 | 0 | 0 |
| $P_2$ | 0 | 0 | 0 | 0 | 0 |
| F | 550* | 524* | 500* | 521* | 503* |
| r | | | | | |
| R | 0.75 | 0.77 | 0.80 | 0.79 | 0.78 |

TABLE 11-continued

| Ex. | 58 | 59 | 60 | 61 | 62 |
|---|---|---|---|---|---|
| Δ |  | 0.258 | 0.269 | 0.272 | 0.341 |
| D | 0.103 | 0.257 | 0.206 | 0.181 | 0.282 |

TABLE 12

| | Ex. | | | | | | | | |
|---|---|---|---|---|---|---|---|---|---|
| | 1 | 2 | 3 | 4 | 5 | 6 | 7 | 8 | 9 |
| $SiO_2$ | 70.6 | 74.1 | 72.1 | 72.6 | 70.2 | 70.4 | 69.9 | 71.1 | 70.6 |
| $Al_2O_3$ | 11.5 | 8.2 | 8.4 | 8.4 | 11.4 | 11.5 | 11.4 | 10.1 | 11.7 |
| MgO | 3.9 | 3.9 | 5.3 | 6.7 | 3.5 | 3.6 | 3.5 | 6.6 | 6.6 |
| CaO | 0 | 0 | 0 | 0 | 0 | 0 | 0 | 0 | 0 |
| $ZrO_2$ | 0 | 0 | 0 | 0 | 1.0 | 0.6 | 1.3 | 0 | 0 |
| $Na_2O$ | 14.0 | 13.9 | 14.3 | 12.3 | 13.9 | 13.9 | 13.8 | 12.2 | 11.1 |
| $K_2O$ | 0 | 0 | 0 | 0 | 0 | 0 | 0 | 0 | 0 |

TABLE 13

| | Ex. | | | | | | | | |
|---|---|---|---|---|---|---|---|---|---|
| | 10 | 11 | 12 | 13 | 14 | 15 | 16 | 17 | 18 |
| $SiO_2$ | 70.4 | 71.6 | 72.1 | 69.8 | 68.6 | 67.0 | 68.5 | 69.7 | 76.5 |
| $Al_2O_3$ | 11.6 | 10.1 | 10.2 | 11.7 | 13.3 | 14.6 | 9.9 | 14.6 | 8.0 |
| MgO | 5.9 | 8.0 | 9.4 | 5.3 | 3.9 | 4.5 | 6.7 | 3.8 | 3.8 |
| CaO | 0 | 0 | 0 | 0 | 0 | 0 | 0 | 0 | 0 |
| $ZrO_2$ | 0 | 0 | 0 | 0 | 0 | 0 | 1.3 | 0 | 0 |
| $Na_2O$ | 12.1 | 10.3 | 8.3 | 13.2 | 14.2 | 13.8 | 12.1 | 11.8 | 11.7 |
| $K_2O$ | 0 | 0 | 0 | 0 | 0 | 0 | 1.5 | 0 | 0 |

TABLE 14

| Ex. | 19 | 20 | 21 | 22 |
|---|---|---|---|---|
| $SiO_2$ | 59.5 | 69.5 | 82.2 | 79.5 |
| $Al_2O_3$ | 23.3 | 8.4 | 5.0 | 6.8 |
| MgO | 3.1 | 10.0 | 0.7 | 6 |
| CaO | 0 | 0 | 0 | 0 |
| $ZrO_2$ | 0 | 0 | 0 | 0 |
| $Na_2O$ | 14.1 | 7.16 | 12.1 | 6.1 |
| $K_2O$ | 0 | 2.95 | 0 | 1.6 |

TABLE 15

| | Ex. | | | | | | | |
|---|---|---|---|---|---|---|---|---|
| | 23 | 24 | 25 | 26 | 27 | 28 | 29 | 30 |
| $SiO_2$ | 67.4 | 65.9 | 63.4 | 63.5 | 72.8 | 61.9 | 60.9 | 78.3 |
| $Al_2O_3$ | 14.9 | 9.8 | 9.7 | 11.4 | 1.9 | 17.1 | 9.6 | 5.2 |
| MgO | 2.6 | 6.8 | 6.9 | 7.1 | 3.7 | 3.9 | 7.0 | 8.2 |
| CaO | 0 | 0 | 0 | 0 | 8.1 | 0.6 | 0.0 | 0 |
| $ZrO_2$ | 0 | 2.5 | 3.7 | 0 | 0 | 0 | 4.8 | 0 |
| $Na_2O$ | 15.1 | 12.0 | 11.8 | 11.9 | 13.1 | 12.7 | 11.7 | 8.4 |
| $K_2O$ | 0 | 3.0 | 4.5 | 6.0 | 0.3 | 3.5 | 5.9 | 0 |

TABLE 16

| | Ex. | | | | | | | | |
|---|---|---|---|---|---|---|---|---|---|
| | 31 | 32 | 33 | 34 | 35 | 36 | 37 | 38 | 39 |
| $SiO_2$ | 71.5 | 69.8 | 71.4 | 69.9 | 71.3 | 70.0 | 70.4 | 70.9 | 70.2 |
| $Al_2O_3$ | 10.7 | 12.3 | 11.5 | 11.5 | 11.4 | 11.5 | 13.1 | 9.9 | 13.1 |
| MgO | 3.9 | 3.9 | 3.2 | 4.6 | 3.9 | 3.9 | 2.6 | 5.2 | 3.9 |

TABLE 16-continued

| | Ex. | | | | | | | | |
|---|---|---|---|---|---|---|---|---|---|
| | 31 | 32 | 33 | 34 | 35 | 36 | 37 | 38 | 39 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 14.0 | 14.0 | 13.9 | 14.0 | 13.4 | 14.5 | 13.9 | 14.0 | 12.9 |
| $K_2O$ | 0 | 0 | 0 | 0 | 0 | 0 | 0 | 0 | 0 |

TABLE 17

| | Ex. | | | | | | | | |
|---|---|---|---|---|---|---|---|---|---|
| | 40 | 41 | 42 | 43 | 44 | 45 | 46 | 47 | 48 |
| $SiO_2$ | 71.1 | 70.5 | 70.7 | 68.9 | 71.9 | 69.1 | 70.4 | 70.3 | 69.7 |
| $Al_2O_3$ | 9.9 | 11.5 | 11.5 | 13.2 | 11.4 | 11.6 | 11.5 | 12.3 | 12.3 |
| MgO | 3.9 | 4.5 | 3.3 | 3.9 | 3.9 | 5.2 | 5.2 | 4.5 | 4.5 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 15.1 | 13.5 | 14.5 | 14.0 | 12.9 | 14.1 | 12.9 | 12.9 | 13.5 |
| $K_2O$ | 0 | 0 | 0 | 0 | 0 | 0 | 0 | 0 | 0 |

TABLE 18

| | Ex. | | | | | | | | |
|---|---|---|---|---|---|---|---|---|---|
| | 49 | 50 | 51 | 52 | 53 | 54 | 55 | 56 | 57 |
| $SiO_2$ | 69.8 | 70.6 | 70.0 | 70.3 | 70.4 | 70.2 | 70.9 | 71.7 | 71.1 |
| $Al_2O_3$ | 11.5 | 12.9 | 11.6 | 11.2 | 10.8 | 11.3 | 10.8 | 10.0 | 10.3 |
| MgO | 5.2 | 3.2 | 4.9 | 4.9 | 5.2 | 5.2 | 5.2 | 5.6 | 5.6 |
| CaO | 0 | 0 | 0 | 0 | 0 | 0 | 0 | 0 | 0 |
| $ZrO_2$ | 0 | 0 | 0 | 0 | 0 | 0 | 0 | 0 | 0 |
| $Na_2O$ | 13.5 | 13.3 | 13.5 | 13.6 | 13.6 | 13.3 | 13.1 | 12.7 | 13.0 |
| $K_2O$ | 0 | 0 | 0 | 0 | 0 | 0 | 0 | 0 | 0 |

TABLE 19

| Ex. | 58 | 59 | 60 | 61 | 62 |
|---|---|---|---|---|---|
| $SiO_2$ | 71.3 | 69.3 | 70.9 | 69.7 | 70.5 |
| $Al_2O_3$ | 10.5 | 13.3 | 12.4 | 13.4 | 12.4 |
| MgO | 5.6 | 2.9 | 2.8 | 2.9 | 2.8 |
| CaO | 0 | 0.5 | 0 | 0 | 0.5 |
| $ZrO_2$ | 0 | 0 | 0 | 0 | 0 |
| $Na_2O$ | 12.6 | 13.9 | 13.8 | 14.0 | 13.8 |
| $K_2O$ | 0 | 0 | 0 | 0 | 0 |

Further, 20 sheets of each of the glass plates having a size of 100 mm×50 mm and a thickness of 1 mm and having a mirror-polished surface in Examples 1, 8, 28 and 29 were subjected to a chemical tempering treatment. S was 700 MPa and t was 45 μm of the chemically tempered glass plate in Example 1, S was 700 MPa and t was 45 μm in Example 8, S was 800 MPa and t was 40 μm in Example 28, and S was 650 MPa and t was 55 μm in Example 29. To each of these chemically tempered glass plates, a force of x (unit: kgf) in Table 20 was applied by a Vickers indenter, and the breakage ratio (unit: %) was measured. Measurement was carried out by a Knoop hardness meter FV-700 manufactured by FUTURE-TECH CORP. for an application time of 15 seconds and a pressing rate of 17 mm/sec.

From these measurement results, it is found that the glasses in Examples of the present invention are hardly broken even when a Vickers indenter was pressed under a high load.

TABLE 20

| x | Ex. 1 | Ex. 8 | Ex. 28 | Ex. 29 |
|---|---|---|---|---|
| 5 | 0 | 0 | 30 | 0 |
| 10 | 0 | 0 | 100 | 0 |
| 20 | 20 | 80 | — | 100 |
| 30 | 70 | 100 | — | 100 |

Further, 20 sheets of each of the glass plates having a size of 100 mm×50 mm and a thickness of 1 mm and having a mirror-polished surface in Examples 1, 8, 28 and 29 were subjected to a chemical tempering treatment. S was 700 MPa and t was 45 μm of the chemically tempered glass plate in Example 1, S was 700 MPa and t was 45 μm in Example 8, S was 800 MPa and t was 40 μm in Example 28, and S was 650 MPa and t was 55 μm in Example 29. To each of these chemically tempered glass plates, a force of x (unit: kgf) in Table 21 was applied by a Knoop indenter, and the breakage ratio (unit: %) was measured. Measurement was carried out by a Knoop hardness meter FV-700 manufactured by FUTURE-TECH CORP. for an application time of 15 seconds and a pressing rate of 17 mm/sec.

From these measurement results, it is found that the glasses in Examples of the present invention are hardly broken even when a Knoop indenter was pressed under a high load.

TABLE 22

| x | Ex. 1 | Ex. 8 | Ex. 28 | Ex. 29 |
|---|---|---|---|---|
| 5 | 0 | 10 | 10 | 10 |
| 10 | 0 | 60 | 100 | 60 |
| 20 | 0 | 90 | — | 90 |
| 30 | 37 | 80 | — | 80 |
| 50 | 60 | — | — | — |

Further, with respect to Examples 1, 8 and 28, of the glasses which were not broken by the above test, the indentation was measured. The length l (unit: μm) and the depth d (unit: μm) of the indentation are shown in Table 22.

From these measurement results, it is found that the glasses in Examples of the present invention are hardly broken even when a great indentation dent is formed.

TABLE 22

| x | Ex. 1 l | Ex. 1 d | Ex. 8 l | Ex. 8 d | Ex. 28 l | Ex. 28 d |
|---|---|---|---|---|---|---|
| 5 | 387 | 13 | 386 | 13 | 389 | 13 |
| 10 | 567 | 19 | 550 | 18 | — | — |
| 20 | 805 | 27 | — | — | — | — |
| 30 | 995 | 33 | — | — | — | — |
| 50 | 1135 | 38 | — | — | — | — |

INDUSTRIAL APPLICABILITY

The glass for chemical tempering and the chemically tempered glass of the present invention are useful for e.g. a cover glass for a display device. Further, they are useful also for e.g. a solar cell substrate or a window glass for aircrafts.

This application is a continuation of PCT Application No. PCT/JP2011/061454, filed on May 18, 2011, which is based upon and claims the benefits of priorities from Japanese Patent Application No. 2010-115365 filed on May 19, 2010, Japanese Patent Application No. 2010-278106 filed on Dec. 14, 2010 and Japanese Patent Application No. 2010-288255 filed on Dec. 24, 2010. The contents of those applications are incorporated herein by reference in their entireties.

The invention claimed is:

1. A chemically tempered glass obtained by chemically tempering a glass comprising, as represented by mole percentage based on the following oxides:
   from 65 to 85% of $SiO_2$;
   from 3 to 15% of $Al_2O_3$;
   from 5 to 15% of $Na_2O$;
   from 0 and less than 2% of $K_2O$;
   from 0 to 15% of MgO; and
   from 0 to 1% of $ZrO_2$,
   wherein a total content $SiO_2+Al_2O_3$ of $SiO_2$ and $Al_2O_3$ is at most 88%, and
   wherein D calculated by the following formula with the contents of the respective components is at most 0.18:

$D=12.8-0.123\times SiO_2-0.160\times Al_2O_3-0.157\times MgO-0.163\times ZrO_2-0.113\times Na_2O$.

2. The chemically tempered glass of claim 1, comprising:
   from 68 to 80% of $SiO_2$;
   from 4 to 10% of $Al_2O_3$;
   from 0 to 1% of $K_2O$; and
   at least 4% of MgO,
   wherein a total content $SiO_2+Al_2O_3$ is at most 85%.

3. The chemically tempered glass of claim 1, which contains no CaO, or has a CaO content of less than 1% if contained.

4. The chemically tempered glass of claim 1, comprising:
   at most 77% of $SiO_2$;
   at least 8% of $Na_2O$; and
   at least 3% of MgO,
   wherein a total content $SiO_2+Al_2O_3$ is at most 85%, a content of CaO is less than 1% if contained, and
   wherein R calculated by the following formula with the contents of the respective components is at least 0.66:

$R=0.029\times SiO_2+0.021\times Al_2O_3+0.016\times MgO-0.004\times CaO+0.016\times ZrO_2+0.029\times Na_2O+0\times K_2O-2.002$.

5. The chemically tempered glass of claim 1, comprising:
   at most 77% of $SiO_2$;
   at least 8% of $Na_2O$; and
   at least 3% of MgO,
   wherein a total content $SiO_2+Al_2O_3$ is at most 85%, a content of CaO is less than 1% if contained, and wherein the glass contains no $K_2O$.

6. The chemically tempered glass of claim 1, wherein a total content $SiO_2+Al_2O_3$ is at least 75%.

7. The chemically tempered glass of claim 1, comprising at least 4.5% of $Al_2O_3$.

8. The chemically tempered glass of claim 1, comprising:
   from 70 to 75% of $SiO_2$;
   at least 5% of $Al_2O_3$;
   at least 8% of $Na_2O$; and
   from 5 to 12% of MgO,
   wherein a total content $SiO_2+Al_2O_3$ is from 77 to 83%.

9. The chemically tempered glass of claim 1, comprising at most 6% of $Al_2O_3$.

10. The glass of claim 1, comprising at least 8% of MgO.

11. The chemically tempered glass of claim 1, wherein a total content of CaO, SrO, BaO, and $ZrO_2$ is less than 1.5% if at least one of these four components is contained.

12. The chemically tempered glass of claim 1, wherein a total content of $SiO_2$, $Al_2O_3$, $Na_2O$, and MgO is at least 98%.

13. The chemically tempered glass of claim 1, wherein when it is formed into a glass plate having a thickness of 1 mm and chemically tempered, and when a force of 98 N is applied to its mirror-polished surface by means of a Vickers indenter, the probability that the chemically tempered glass plate is broken is at most 10%.

14. The chemically tempered glass of claim 1, wherein when it is formed into a glass plate having a thickness of 1 mm and chemically tempered, and when a force of 196 N is applied to its mirror-polished surface by means of a Knoop indenter, the probability that the chemically tempered glass plate is broken is at most 10%.

15. The chemically tempered glass of claim 1, wherein Δ represented by the following formula is at most 0.21:

$$\Delta = (S_{400} - S_{450})/S_{400}$$

wherein $S_{400}$ is a surface compressive stress obtained when the glass is formed into a glass plate having a thickness of 1 mm and immersed in $KNO_3$ at 400° C. for 6 hours, and $S_{450}$ is a surface compressive stress obtained when the glass is formed into a glass plate having a thickness of 1 mm and immersed in $KNO_3$ at 450° C. for 6 hours.

16. The chemically tempered glass of claim 1, which has a compressive stress layer thickness of at least 10 μm, and a surface compressive stress of at least 400 MPa.

17. The chemically tempered glass of claim 1, wherein D is at most 0.130.

18. A glass plate obtained by chemically tempering a glass plate comprising a glass comprising, as represented by mole percentage based on the following oxides:
- from 65 to 85% of $SiO_2$;
- from 3 to 15% of $Al_2O_3$;
- from 5 to 15% of $Na_2O$;
- from 0 and less than 2% of $K_2O$;
- from 0 to 15% of MgO; and
- from 0 to 1% of $ZrO_2$, wherein a total content $SiO_2+Al_2O_3$ of $SiO_2$, and $Al_2O_3$ is at most 88%, and wherein D calculated by the following formula with the contents of the respective components is at most 0.18:

$$D = 12.8 - 0.123 \times SiO_2 - 0.160 \times Al_2O_3 - 0.157 \times MgO - 0.163 \times ZrO_2 - 0.113 \times Na_2O.$$

19. A display device, comprising a cover glass comprising the glass plate of claim 18.

20. The display device of claim 19, which is a mobile device, a touch panel, or a flat screen television having a size of at least 20 inches.

* * * * *